United States Patent [19]

Iwamoto

[11] Patent Number: 5,048,694
[45] Date of Patent: Sep. 17, 1991

[54] APPARATUS FOR PROCESSING CARD-LIKE ARTICLES

[75] Inventor: Kozo Iwamoto, Yokohama, Japan

[73] Assignee: Kabushiki Kaisha Toshiba, Kawasaki, Japan

[21] Appl. No.: 514,258

[22] Filed: Apr. 25, 1990

[30] Foreign Application Priority Data

May 10, 1989 [JP] Japan .................................. 1-116292

[51] Int. Cl.⁵ .............................................. B07C 5/02
[52] U.S. Cl. .................................... 209/540; 209/548; 209/556; 209/559; 209/900; 271/202; 271/270
[58] Field of Search ............... 209/540, 548, 551, 555, 209/556, 558, 900, 559; 414/798.9; 198/462; 271/184, 185, 202, 270

[56] References Cited

U.S. PATENT DOCUMENTS

| | | | |
|---|---|---|---|
| 4,136,780 | 1/1979 | Hunter et al. | 209/900 X |
| 4,606,660 | 8/1986 | Bradshaw et al. | 209/900 X |
| 4,641,753 | 2/1987 | Tamada . | |
| 4,787,518 | 11/1988 | Yuge et al. | 209/551 X |
| 4,815,582 | 3/1989 | Canzrani | 209/914 X |
| 4,863,037 | 9/1989 | Stevens et al. | 209/3.1 |
| 4,986,423 | 1/1991 | Takeda | 209/900 X |

Primary Examiner—Donald T. Hajec
Assistant Examiner—Joseph A. Kaufman
Attorney, Agent, or Firm—Finnegan, Henderson, Farabow, Garrett, and Dunner

[57] ABSTRACT

An automatic sorting and stamping apparatus includes a supply section to which a stack of mail items including standard-size items and nonstandard-size items is placed. The supplied mail items are transferred to a sorting and stamping section along a transfer path extending through a plurality of processing units while being applied with desired processes thereby. The transfer path is constructed by a plurality of conveyors whose operations are controlled by a control section. The control section stores various control values for determining the operations of the conveyors. One of the control values, which is suitable for processing the mail items of the supplied stack, is selected in accordance with the ratio of nonstandard-size items to all mail items forming the supplied stack. The conveyors are driven, based on the selected control value.

13 Claims, 4 Drawing Sheets

APPARATUS FOR PROCESSING CARD-LIKE ARTICLES

BACKGROUND OF THE INVENTION

1. Field of the Invention

The present invention relates to an apparatus for processing card-like articles, such as mails, more precisely, sorting and stamping card-like articles.

2. Description of the Related Art

A mail sorting/stamping apparatus is known which comprises a supply section, a hopper, a unit for sorting items of mails in accordance with their thicknesses, a V-chute, a unit for sorting items of mails in accordance with their widths, a shifting unit, a pickup unit, a unit for detecting foreign matters and hard matters, a buffer unit, a stamping unit, and a collecting unit. A transfer path extends from the hopper to the collecting unit, and a number of mail items are supplied through the transfer path from the supply section to the collecting section. Several detectors are located besides that portion of the transfer path which extends from the hopper to the buffer. Each of these detectors detect the flow rate of mail, i.e., the number of mail items passing by the detector per a unit of time, and generates an electrical signal showing the flow rate of mail. The mail flow rate represented by the signal is adjusted to a fixed optimum value which has been determined by an average ratio of nonstandard-size mail items and thick mail items to all mail items forming a stack set in the supply section. However, in this method of adjusting the mail flow rate, when the ratio is much higher or lower the average, the items of mail may jam, be folded, or overlap, and can no longer be transported smoothly in the transfer path. Consequently, the mail sorting/stamping apparatus fails to operate with sufficient efficiency or reliability.

SUMMARY OF THE INVENTION

Accordingly, it is the object of the invention to provide an apparatus for processing card-like articles, which can transport card-like articles smoothly and can, therefore, process them with high efficiency.

To attain the object, an apparatus according to the invention has a control section and an input section. The control section stores various predetermined control values for operating the apparatus at an optimum condition in accordance with the condition of a stack of card-like articles which are to be processed. An operator sees the stack and determines the condition of the stack. Then, he or she operates one of the switches of the input section in accordance with the determined condition, thus selecting the control value most suitable for processing the card-like articles. The rate at which the card-like articles are transported is adjusted to the selected control value.

The apparatus according to the invention may have detectors located along a transfer path of the card-like articles, for detecting the flow rate of the articles, a unit for sorting the articles in accordance with their thicknesses, and a unit for sorting the articles in accordance with their widths. The rate at which the card-like articles pass by each detector can be automatically adjusted in accordance with the ratio of nonstandard-size articles to all card-like articles, which has been determined by counting the articles of two kinds sorted by the sorting units.

According to the present invention, there is provided an apparatus for processing card-like articles, which comprises means for receiving various kind of card-like articles; means for applying desired processes to the received card-like articles; means for transferring the card-like articles through the applying means; means for detecting the number of the card-like articles being transferred by the transferring means; means for controlling the operating condition of the transferring means in response to the number detected by the detecting means, the controlling means having various control values for determining the operating condition of the transferring means; and means for selecting one of the control values, which is suitable for processing the received card-like articles.

Additional objects and advantages of the invention wil be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 through 5 show a mail processing apparatus according to an embodiment of the present invention, in which;

FIG. 1 is a plan view schematically showing the apparatus;

FIG. 2 is a side view schematically showing the apparatus;

FIG. 3 is a plan view of a transfer mechanism;

FIG. 4 is a sectional view showing the transfer mechanism; and

FIG. 5 is a timing chart showing the operating condition of the transfer mechanism relative to the detection by a detector.

DETAILED DESCRIPTION OF THE PREFERRED EMBODIMENTS

Figure 1:
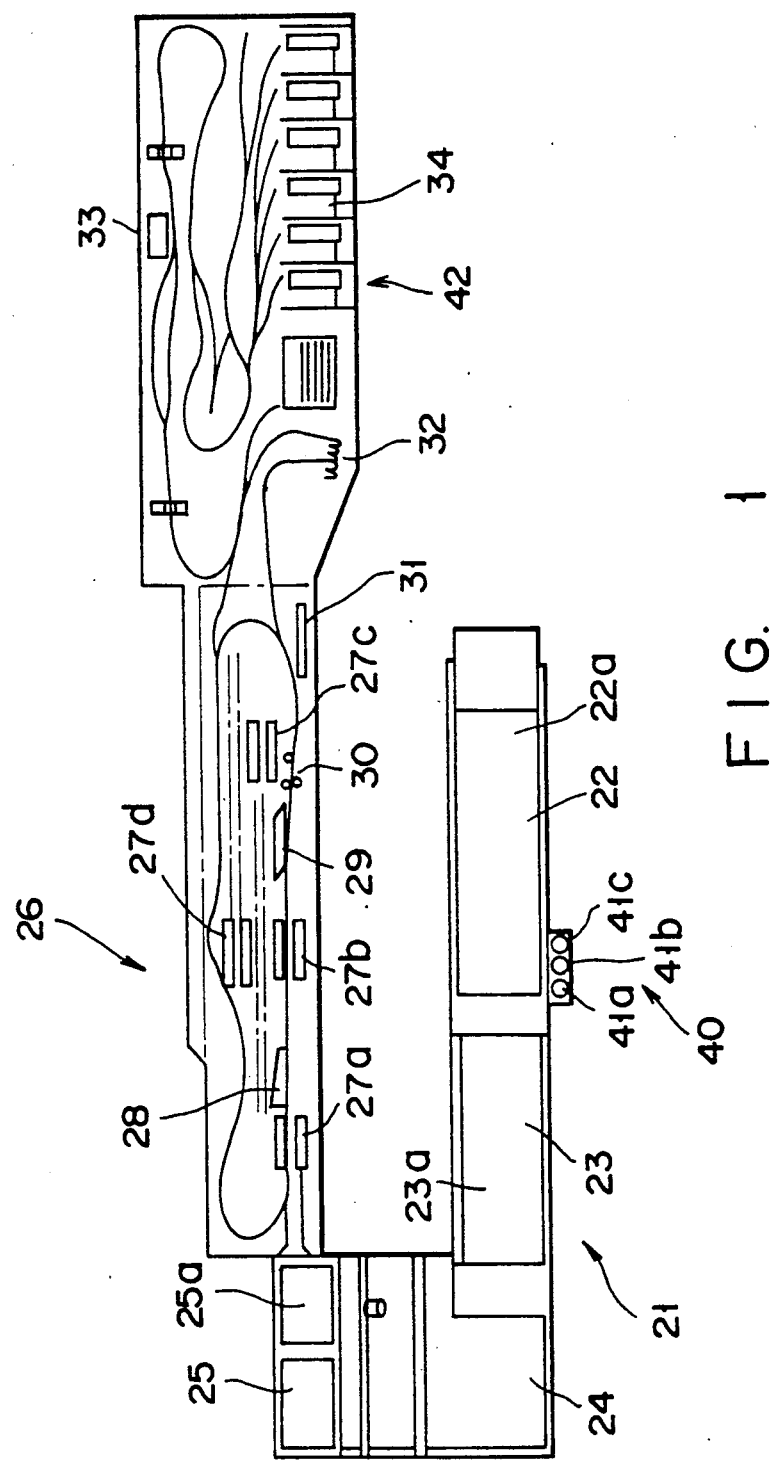
Figure 2:
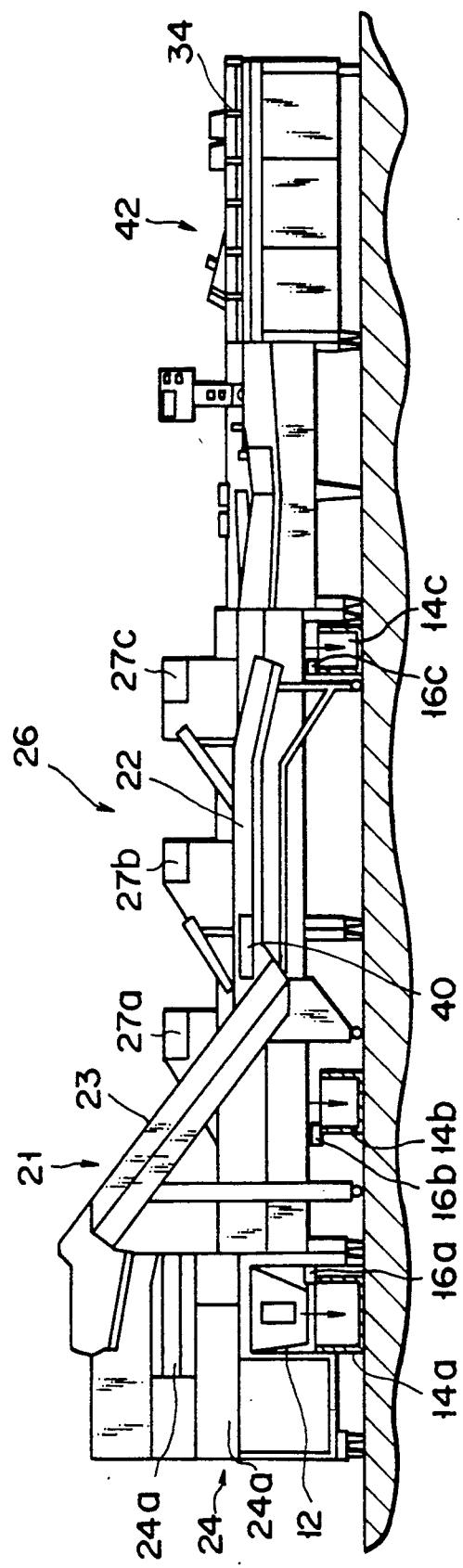

FIGS. 1 and 2 show an automatic mail sorting and stamping apparatus according to an embodiment of the present invention. This apparatus includes mainly a supply section 21, a backside processing section 26 and a stamping and storing section 42.

The supply section 21 has a supply table 22 on which a stack of a large number of mail items including standard-size ones and nonstandard-size ones is placed. The placed mail items are transferred to a hopper 23 by a belt conveyor 23a of the supply table 22. The hopper 23 further transfers the mail items by its belt conveyor 23a while adjusting the flow rate of mail, i.e., the number of the mail items. The supply section 21 further includes a thickness-sorting unit 24 and a V-chute 25 following to the hopper 23. The mail items conveyed from the hopper 23 are transferred by a plurality of belt conveyors 24a in the unit 24 while being kept horizontal. The unit 24 rejects the mail items having a thickness greater than a reference value, i.e., 6 mm, whereby these mail items are removed from the belt conveyors 24a. The remaining ones having a thickness smaller than the predetermined value are erected by the V-chute 25 and conveyed to the backside processing section 26 by a belt conveyor 25a. The removed mail items with a nonstandard thickness are introduced into a discharge box 14a through a chute 12. A first sensor 16a is arranged between the chute 12 and the discharge box 14a to detect the number of the removed mail items.

The processing section 26 includes a first width-sorting unit 27a, shifting unit 28, second width-sorting unit 27b, pickup unit 29, unit 30 for detecting foreign and hard substances in the mail items, and discharge unit 31 which are arranged in this order. The mail items transferred from the supply section 21 are conveyed passing through these units along a transfer path constituted by a plurality of belt conveyors. The processing section 26 further includes third and fourth width-sorting units 27c and 27d and the like.

The mail items conveyed from the V-chute 25 while being erected are sorted by the first unit 27a into the ones having a width of 120 mm or less and others having a width larger than 120 mm. The nonstandard-size items having a width larger than 120 mm are removed from the transfer path by the unit 27a. The remaining mail items passed through the unit 27a are transferred to the shifting unit 28 while being erected and overlapped one another. The unit 28 shifts the mail items from one another and transfers them to the second width-sorting unit 27b where the mail items having a width larger than the predetermined width are removed from the transfer path. The mail items passed through the unit 27b are picked up one by one by the unit 29. The detector unit 30 recognizes whether or not each of the picked up mail items includes foreign or hard substances therein, and those mail items including foreign or hard substances therein are removed or discharged from the transfer path by the discharge unit 31. The mail items removed from the transfer path by the first sorting unit 27a are introduced into a discharge box 14b. The mail items removed by the second to forth sorting units 27b, 27c, and 27d and by the discharge unit 31 are introduced into a discharge box 14c. These boxes 14b and 14c are located below the transfer path. Second and third sensors 16b and 16c are located adjacent to the discharge boxes 14b and 14c to detect the number of the mail items introduced into these boxes, respectively.

The stamping and storing section 42 includes a buffer unit 32 for temporarily storing the mail items conveyed from the processing section 26 and then picking them up one by one according to the switchback manner, a unit 33 for stamping them one by one, and a unit 34 for storing the stamped articles.

The processing section 26 will be described in more detail.

Figure 3:
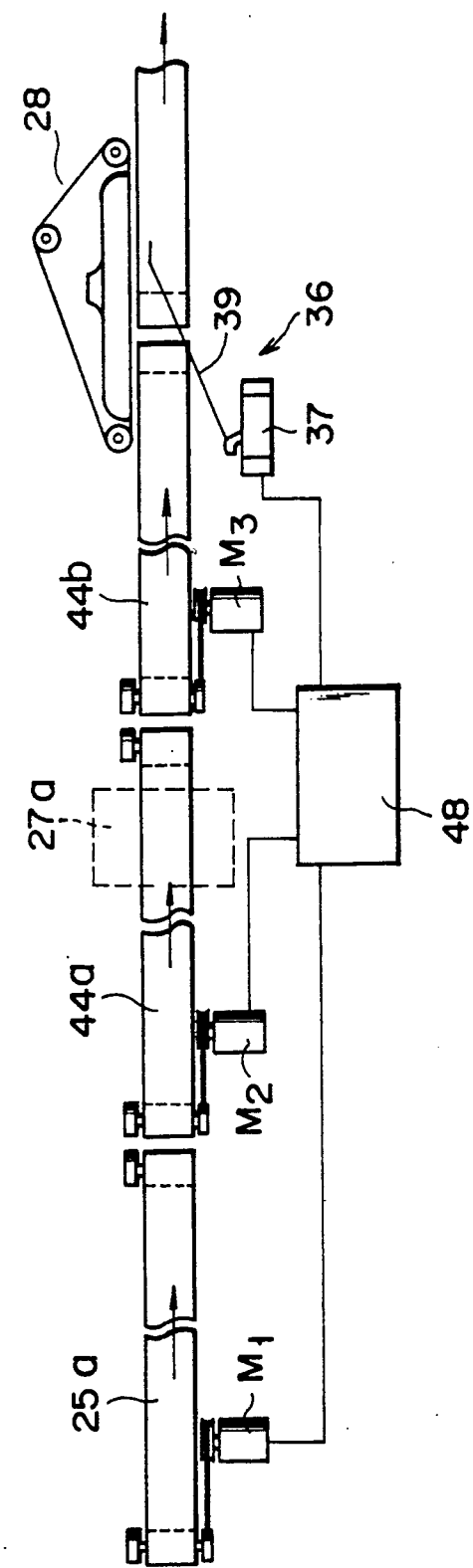
Figure 4:
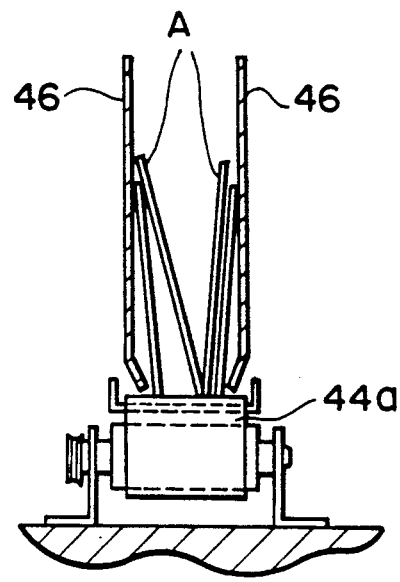
Figure 5:
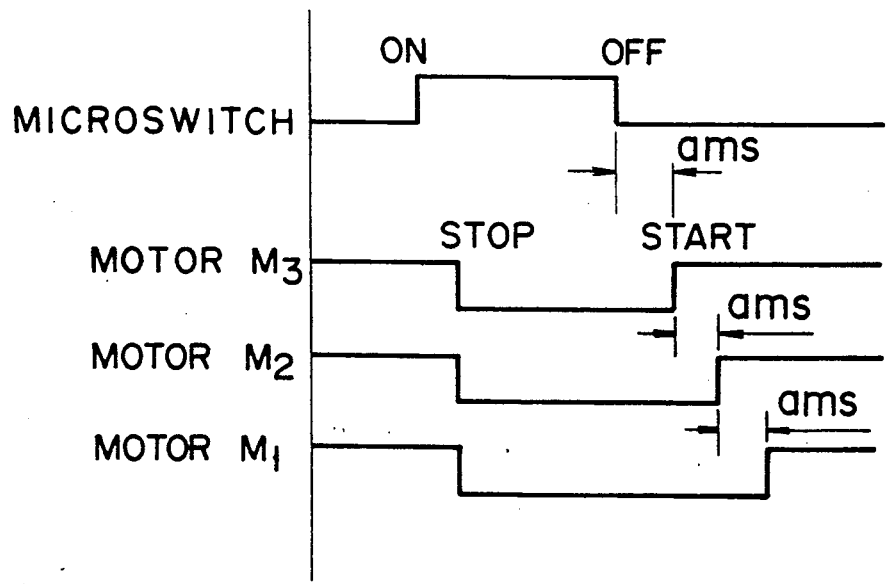

As shown in FIGS. 2 and 3, bet conveyors 44a and 44b constituting a part of the transfer path are continuously arranged between the conveyor 25a in the V-chute 25 and the shifting unit 28. These conveyors 25a, 44a and 44b can be independently driven by their corresponding motors M1, M2 and M3. Similarly, the belt conveyors 22a, 23a, 24a in the supply section 21 and the other belt conveyors constituting the transfer path in the processing section 26 can be independently driven by their respective motors (not shown). These motors are electrically connected to a control section 48. On both sides of each of the conveyors 44a and 44b are erected a pair of guide plates 46 which are parallel to each other and separated from each other by a predetermined distance. The mail items (A) conveyed through the V-chute 25 are guided by the guide plates 46 and conveyed on the belt conveyors while being erected, as apparent from FIG. 4.

A detector 36 for detecting the number of mail items transferred through the conveyor 44b is arranged in opposite to the shifting unit 28. The detector 36 has a micro-switch 37 connected to the control section 48, and a detection lever 39 swingably attached to the micro-switch 37 and projects into the transfer path. When a predetermined number of mail items are transferred to the unit 28 the detection lever 39 is pushed and swung in the clockwise direction by these mail items to thereby turning the switch 37 on. When the micro-switch 37 is turned on in this manner, the control section 48 stops the motors M1, M2, M3 and the other motors simultaneously so that the transfer of mail items can be stopped. Under this condition, when a predetermined number of the mail items are picked up by the shifting unit 28, the detection lever 39 swings in the counterclockwise direction to thereby turning the switch 37 off. The control section 48 therefore starts the motors M1, M2, M3 and the others successively, as will be described later, so as to start the transfer of mail items again.

Stack of mail items are placed on the supply table 22, which are different in the ratio of the nonstandard-size items and the thick ones to all mail items. Provided that the apparatus is operated, transferring the mail items at a certain speed.

In a case where the ratio of nonstandard-size mail items to all mail items placed on the supply table 22 is extremely high, most of the mail items will be removed from the transfer path during they pass through the supply section 21 and the processing section 26. There fore, no mail items are bent and jammed on the transfer path and in each of the units. However, the number of the mail items coming into the stamping and storing section 42 will become extremely small, thereby causing the processing efficiency of the apparatus to be lowered. When the ratio of nonstandard-size mail items is extremely low, most of the mail items places on the supply table 22 will be transferred through the transfer path to the stamping and storing section 42 without being removed from the path. Thus, a large number of the mail items pas through the transfer path and each of the units, thereby easily causing the items to be bent and jammed.

According to this embodiment, the control section 48 stores three programmed control values, one of which is selected in accordance with the ratio of the nonstandard-size mail items to all mail item forming a stack placed on the supply table 22, and which is used to control the transfer rate of the mail items, thereby to prevent the items from jamming or being folded. The first value is suitable for stacks of mail items, having a high ratio of nonstandard-size items. The second value is suitable for stacks of mail items, having a middle ratio of nonstandard-size items. The third value is suitable for stacks of mail items, having a low ratio of nonstandard-size items.

The first through third sensors 16a, 16b and 16c for detecting the number of mail items removed from the transfer path are electrically connected to the control section 48. Responsive to the detection signals from these sensors, the control section 48 detects the ratio of nonstandard-size mail items to all mail items forming a stack which are being processed in the apparatus. The control section 48 automatically selects one of the control values which corresponds to the detected ratio, and controls the operation of the apparatus based on the selected control value.

The apparatus further includes an input section 40 for manually selecting one of the control values, which is suitable for processing mail items of a stack placed on the supply table 22. The input section 40 is located adjacent to the supply table 22 and provided with three selection switches 41a, 41b and 41c corresponding to the three control values.

The operation of the automatic sorting and stamping apparatus having the above-mentioned construction will be described.

When a stack of mail items is placed on the supply table 22 by an operator, the operator sees the stack, and determines the ratio of nonstandard size items to all mail items. He or she selects and turns on the switch 41a when the ratio is supposed high, the switch 41b when middle, or the switch 41c when low.

For example, when the switch 41b is selected after a stack of mail items is placed on the supply table 22, the mail items are transferred to the first width-sorting unit 27a and the shifting unit 28 in the processing section 26, passing through the hopper 23, the thickness-sorting unit 24 and the V-chute 25.

When a predetermined number of the mail items are conveyed to the shifting unit 28, the lever 39 is swung clockwise by these mail items to thereby turning on the micro-switch 37. Then the control section 48 simultaneously stops the motors M1, M2, M3 and the others, all located on the upstream side of the shifting unit 28. The conveyors 22a, 23a, 24a, 25a, 44a and 44b are thereby stopped. While the conveyors are stopped, the unit 28 supplies the mail items to the second width-sorting unit 27b, causing the mail items sliding one upon another. When the number of the mail items in the unit 28 reduces to a value less than a predetermined one, the lever 39 turns off the micro-switch 37.

Then, in accordance with the control value input by operating the switch 41b, the control section 48 drives the conveyors 44b, 44a, and 25a, one after another, with a time delay. More specifically, the section 48 operates the motor M3, thus driving the conveyor 44b, upon lapse of a ms after the switch 37 has been turned off. Then, the section 48 operates the motor M2, thus driving the conveyor 44a, upon lapse of a ms after the motor M3 has been started. Further, the section 48 operates the motor M1, thus driving the conveyors 25a, upon lapse of a ms after the motor M2 has been started. Thereafter, the control section 48 starts driving the conveyors 24a, 23a and 22a, one after another, with a time delay of ms.

TABLE

| Rate of nonstandard-size items | Stop delay time | Start delay time | Switch |
| --- | --- | --- | --- |
| High | 0 | a − α | 41a |
| Medium | 0 | a | 41b |
| Low | 0 | a + α | 41c |

Since the conveyers are started one after another, with a time delay, the rate of transferring the mail items is adjusted such that the mail items neither jam nor be folded while being transferred in the transfer path or the shifting unit 28. In other words, the mail items are transferred smoothly.

When the ratio of nonstandard-size mail items of a stack placed on the supply table 22 is low, the switch 41c is selected. The control section 48 controls the operation of the apparatus based on the control value input by the selected switch 41c. More specifically, after the switch 37 is turned off, the control section 48 starts the conveyors 44b, 44a, 25a, 24a, 23a and 22a, one after another, with a delay time of (a+α)ms. When the ratio is high, the switch 41a is selected and the control section 48 starts the conveyors 44b, 44a, 25a, 24a, 23a and 22a, one after another, with a delay time of (a−α)ms.

As described above, the apparatus can be operated, based on the control value which is selected by the unit 40 according to the ratio of nonstandard-size mail items to all mail times of a stack. When the ratio is low or the number of the mail items passing through the transfer path is large, the motors are started with a time delay longer than that in the case of the ratio is middle, so that the mail items can be prevented from being bent and jammed. When the ratio is high or the number of the mail items passing through the transfer path is small, the motors are started with a time delay shorter than that in the case of the middle ratio to thereby preventing the processing efficiency of the apparatus from being lowered.

In the above described processing course, the control value is manually selected in accordance with the ratio of nonstandard-size mail items. However, the control value may be automatically selected by the control section 48, based on detection signals applied from the first through third sensors 16a, 16b, and 16c.

According to the automatic sorting and stamping apparatus having the above-described arrangement, the transfer of mail items can be controlled, based on a control value selected in accordance with the ratio of nonstandard-size mail items to all items forming a stack placed on the supply table. Thus, the mail items can be stably transferred at a flow rate and a transfer speed most suitable for processing the mail items of the stack. Therefore, the mail items can be efficiently sorted and stamped without being bent and jammed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for conveying card-like articles comprising:
    means for receiving various kinds of card-like articles including standard-size articles and nonstandard-size articles;
    means for applying a sorting process to the received card-like articles;
    means for transferring the card-like articles through the applying means, the transferring means having a plurality of conveyors continuously extending from the receiving means;
    means for detecting the number of the card-like articles being transferred by the transferring means;
    means for controlling a transfer rate of the transferring means in accordance with the number detected by the detecting means, the controlling means employing various control values for determining the transfer rate of the transferring means; and means for selecting one of the control values which is suitable for processing the card-like articles received by the receiving means, the selecting means selecting in accordance with the ratio of the number of nonstandard-size articles to the number of all articles received by the receiving means;

the controlling means including means for stopping the conveyors simultaneously when a first predetermined number of the card-like articles is detected by the detecting means, and means for starting the conveyors with a delay time determined by the selected control value, in the order the conveyors are arranged from the detecting means, when the detecting means detects a second predetermined number of the card-like articles.

2. An apparatus according to claim 1, wherein said control values include a first one suitable for a stack of card-like articles, having a middle ratio of nonstandard-size articles, a second one suitable for a stack of card-like articles, having a high ratio of nonstandard-size articles, and a third one suitable for a stack of card-like articles, having a low ratio of nonstandard-size articles.

3. An apparatus according to claim 2, wherein said setting means includes an input section having first to third switches for selecting the first to third control values, respectively.

4. An apparatus according to claim 2, further including setting means, said setting means having means for measuring the ratio of nonstandard-size articles, and means for automatically selecting one of the control values in accordance with a result measured by the measuring means.

5. An apparatus according to claim 4, wherein said applying means includes means for removing the nonstandard-size articles from the card-like articles being transferred by the transferring means, and said measuring means has sensors for measuring the number of the removed card-like articles.

6. An apparatus according to claim 2, wherein said starting means includes a first delay time determined by the first control value, a second delay time determined by the second control value and shorter than the first delay time, and a third delay time determined by the third control value and longer than the first delay time.

7. An apparatus for sorting and conveying mail items comprising:

means for receiving a stack mail items including standardsize items and a nonstandard-size items;

means for applying sorting processes to the received mail items;

means for transferring the mail items through the applying means;

means for detecting the number of the mail items being transferred by the transferring means;

means for controlling the transfer rate of the transferring means in accordance with the number detected by the detecting means, the controlling means having various control values for determining the transfer rate of the transferring means; and means for selecting, in accordance with the ratio of the nonstandard-size items to all mail items forming the received stack, one of the control values which is suitable for processing the mail items of the received stack.

8. An apparatus according to claim 7, wherein said transferring means includes conveyors continuously extending between the receiving means and the detecting means, and said controlling means includes means for stopping the conveyors simultaneously when a first predetermined number of the mail items is detected by the detecting means, and means for starting the conveyors with a delay time determined by the selected control value, in the order the conveyors are arranged from the detecting means, when the detecting means detects a second predetermined number of the mail items.

9. An apparatus according to claim 8, wherein said control values include a first one suitable for a stack of mail items, having a middle ratio of nonstandard-size items, a second one suitable for a stack of mail items, having a high ratio of nonstandard-sized items, and a third one suitable for a stack of mail items, having a low ratio of nonstandard-size items.

10. An apparatus according to claim 9, wherein said starting means includes a first delay time determined by the first control value, a second delay time determined by the second control value and shorter than the first delay time, and a third delay time determined by the third control value and longer than the first delay time.

11. An apparatus according to claim 9, wherein said selecting means includes an input section having first to third switches for selecting the first to third control values, respectively.

12. An apparatus according to claim 7, wherein said selecting mean includes means for measuring the rate of nonstandard-size items, and means for automatically selecting one of the control values in accordance with a result measured by the measuring means.

13. An apparatus according to claim 12, wherein said processing units include thickness-sorting means for removing those mail items, which have a thickness larger than a predetermined value, from the mail items being transferred by the transferring means, and width-sorting means for removing those mail items, which have a width larger than a predetermined value, from the mail items being transferred by the transferring means, and said measuring means has sensors for measuring the number of the removed mail items.

* * * * *

UNITED STATES PATENT AND TRADEMARK OFFICE
CERTIFICATE OF CORRECTION

PATENT NO. : 5,048,694
DATED : September 17, 1991
INVENTOR(S) : Kozo Iwamoto

It is certified that error appears in the above-identified patent and that said Letters Patent is hereby corrected as shown below:

Claim 7, column 7, lines 47-48, change "standardsize" to --standard-size--.

Claim 7, column 7, line 48, after "and" delete "a".

Claim 12, column 8, line 40, change "mean" to --means--.

Signed and Sealed this

Twenty-second Day of June, 1993

Attest:

MICHAEL K. KIRK

Attesting Officer  Acting Commissioner of Patents and Trademarks